United States Patent
Dube et al.

(10) Patent No.: US 9,348,395 B2
(45) Date of Patent: May 24, 2016

(54) POWER DEMAND REDUCTION SYSTEM

(71) Applicant: Dell Products L.P., Round Rock, TX (US)

(72) Inventors: Shawn Joel Dube, Austin, TX (US); Paul T. Artman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 13/651,572

(22) Filed: Oct. 15, 2012

(65) Prior Publication Data

US 2014/0108831 A1 Apr. 17, 2014

(51) Int. Cl.
*G06F 1/32* (2006.01)

(52) U.S. Cl.
CPC .................... *G06F 1/3206* (2013.01)

(58) Field of Classification Search
CPC .................... G06F 1/26; G06F 1/44
USPC ............... 713/320, 324, 340; 361/688
See application file for complete search history.

(56) References Cited

U.S. PATENT DOCUMENTS

| | | | |
|---|---|---|---|
| 6,219,795 B1 * | 4/2001 | Klein | 713/300 |
| 6,806,673 B2 | 10/2004 | Ho | |
| 7,188,121 B2 * | 3/2007 | Tracey | G06F 9/5055 |
| 7,841,837 B2 | 11/2010 | Chen | |
| 2005/0122679 A1 * | 6/2005 | Von Gutfeld et al. | 361/687 |
| 2006/0185973 A1 * | 8/2006 | Yazawa et al. | 204/155 |
| 2010/0023787 A1 * | 1/2010 | Ho et al. | 713/320 |
| 2012/0030493 A1 * | 2/2012 | Cepulis et al. | 713/324 |
| 2012/0072739 A1 * | 3/2012 | Isaacson | H02J 1/10 713/300 |
| 2012/0080946 A1 * | 4/2012 | Peng | 307/31 |
| 2012/0131363 A1 * | 5/2012 | Hsu | 713/320 |
| 2013/0038255 A1 * | 2/2013 | Trainque | 318/376 |

* cited by examiner

*Primary Examiner* — Vincent Tran
(74) *Attorney, Agent, or Firm* — Haynes and Boone, LLP

(57) ABSTRACT

An information handling system includes a processor, an air moving system, a power system, and power demand reduction circuit. The air moving system is operable to cool the processor. The power system is operable to power the processor and the air moving system. The power demand reduction circuit is operable to detect a total power system power demand that will exceed a power system output capacity of the power system in response to a processor power demand from the processor and, in response, reduce an air moving system power provided to the air moving system such that the processor power demand will no longer cause the total power system power demand to exceed the power system output capacity. The air moving system power may be increased when a decrease in the processor power demand results in the two contributing to a total power system power that will not exceed the power system output capacity.

13 Claims, 6 Drawing Sheets

POWER DEMAND REDUCTION SYSTEM

BACKGROUND

The present disclosure relates generally to information handling systems, and more particularly to power demand reduction system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The power requirements of IHSs are steadily increasing. For example, as processors have added cores and other processing features, the sustainable power requirements, dynamic power requirements, and peak power requirements of the power system have increased. Traditionally, processor thermal design power (TDP) has been used for (indefinitely) sustainable power requirement budgeting purposes, and only a small amount of additional power was budgeted for dynamic power requirements and peak power requirements that are above the TDP of the processor. However, as the number of processor cores has increased (from 1, to 2, to 4, to 8, and to 10 and higher), the ability of all cores to simultaneously transition from an idle state to an active state has driven the dynamic power requirements and peak power requirements rapidly relative to the sustainable power requirements. For example, maximum or peak power ("$P_{max}$", typically sustainable on the order of milliseconds to tens of milliseconds) has grown from 1.3×TDP, to 1.6×TDP, and up to 2.2×TDP, and dynamic power ("$P_{dyn}$", typically sustainable on the order of hundreds of milliseconds to seconds) has grown from 1.0×TDP, to 1.2×TDP, to 1.6×TDP for some processors in the last 5 years. Processor cores and other computing elements can activate on the order of nanoseconds, which is orders of magnitude faster than conventional monitoring and throttling mechanisms can respond, and which can introduce a large power demand spike on the power system (e.g., greater than 200 amps.)

As the number of processors and other high-power devices in the system grows, it becomes less and less feasible to budget the power system based on theoretical dynamic power requirements and peak power requirements, as those theoretical requirements drive excessive power systems that are costly, inefficient, and difficult (if not impossible) to implement.

Accordingly, it would be desirable to provide an improved power system.

SUMMARY

According to one embodiment, an information handling system (IHS) includes a processor; a memory coupled to the processor; an air moving system that is operable to cool the processor and the memory; a power system coupled to the processor, the memory, and the air moving system; and a power demand reduction circuit coupled to the air moving system and the power system, wherein the power demand circuit is operable to: detect a total power system power demand that will exceed a power system output capacity of the power system in response to a processor power demand from the processor; and reduce an air moving system power provided to the air moving system such that the processor power demand from the processor will no longer cause the total power system power demand to exceed the power system output capacity of the power system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
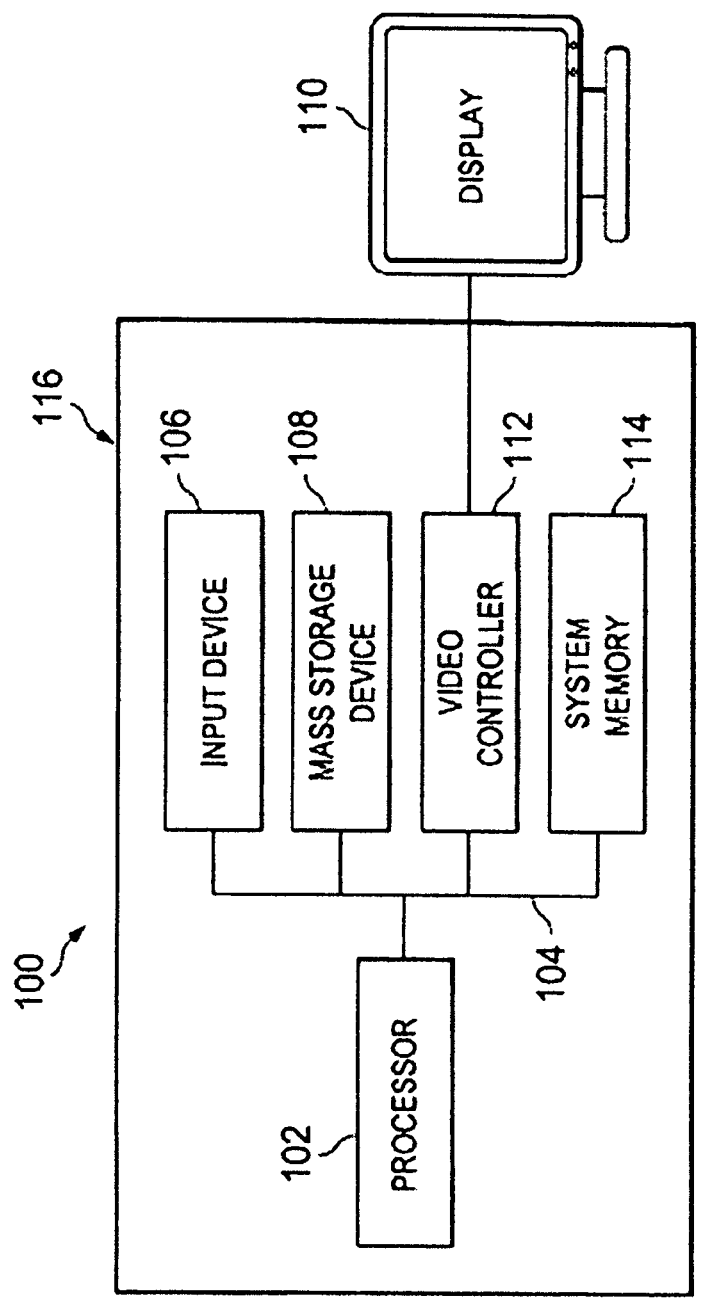
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
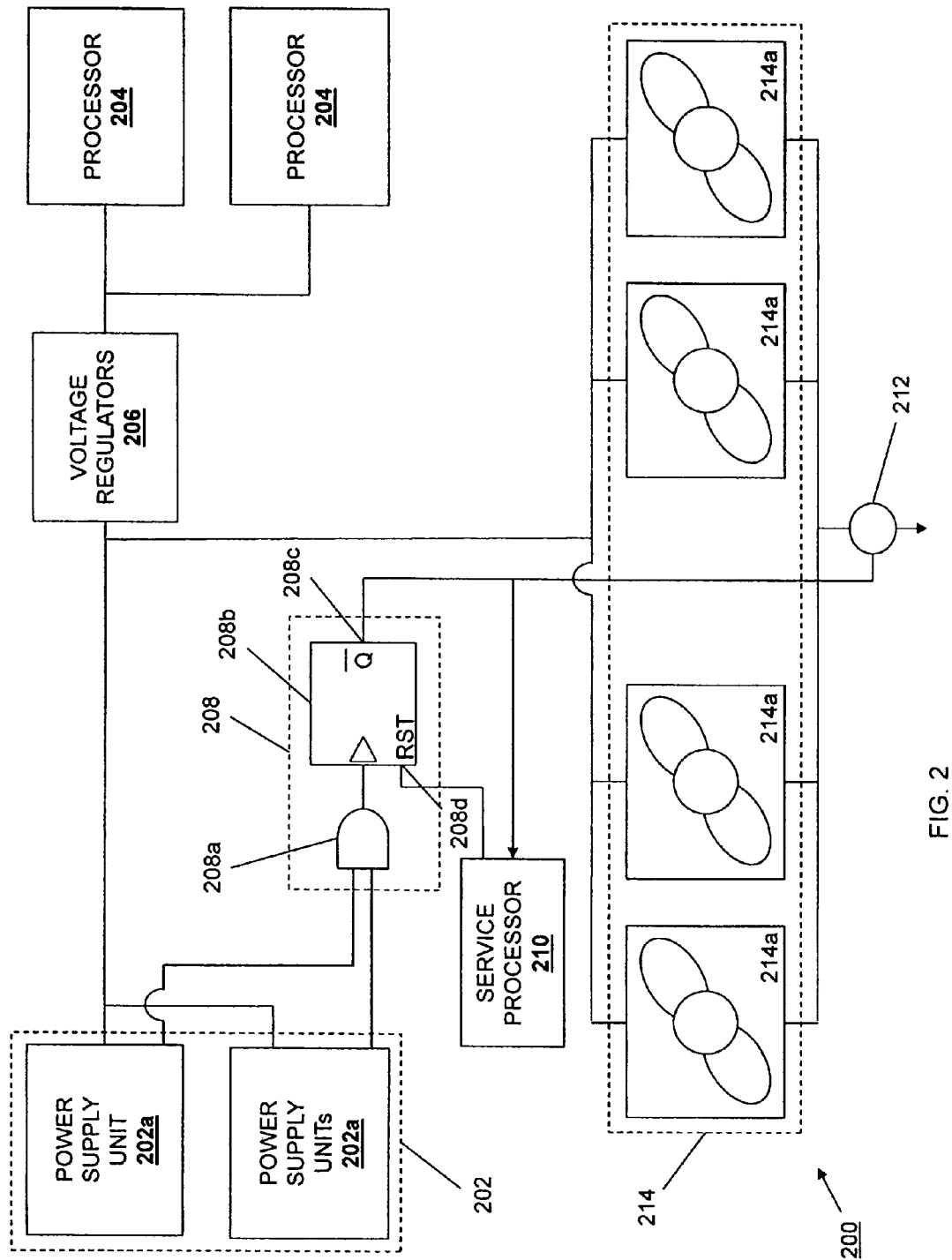
FIG. 2 is a schematic view illustrating an embodiment of a power demand reduction system.
Figure 3:
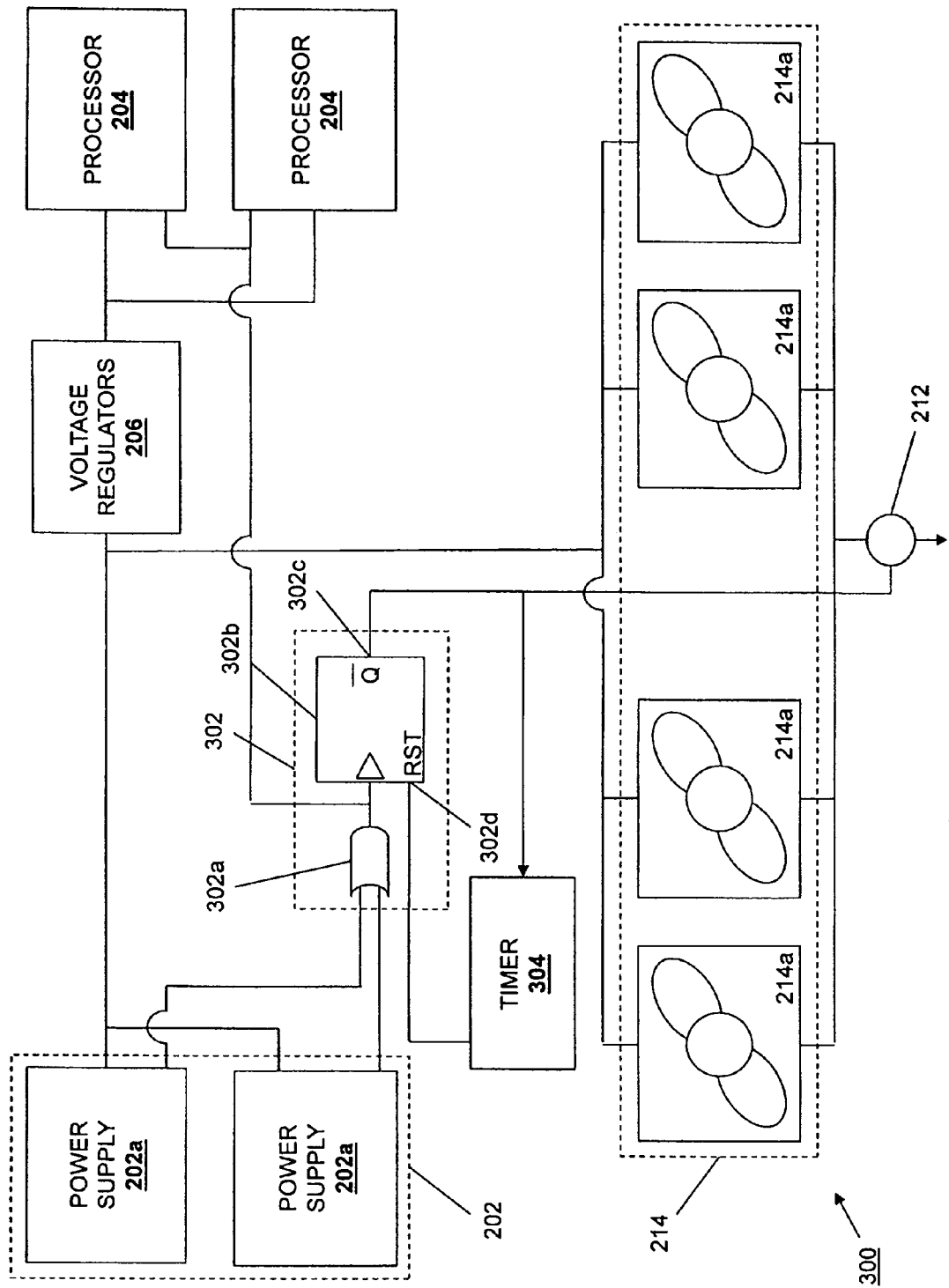
FIG. 3 is a schematic view illustrating an embodiment of a power demand reduction system.

Referring now to FIGS. 2 and 3, embodiments of power demand reduction systems 200 and/or 300 are illustrated. As discussed in further detail below, the power demand reduction systems 200 and/or 300 may be implemented in or with a variety of IHS's known in the art. For example, the power demand reduction system 200/300 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the power demand reduction systems 200 and/or 300 may be implemented with a modular IHS such as, for example, a blade server. As such, in some embodiments, all of the elements in the power demand reduction systems 200 and/or 300 may be housed in an IHS chassis (e.g., the chassis 116 discussed above with reference to FIG. 1), while in other embodiments, elements of the power demand reduction systems 200 and/or 300 may be coupled to the IHS (e.g., a plurality of modular IHSs may be coupled to the power demand reduction system that may include any combination of power supply units (PSUs), power distribution units (PDUs), and/or any a variety of other power system components known in the art, along with any number of air moving systems, discussed in further detail below.) Thus, a wide variety of modification to the specific embodiments discussed below is envisioned as falling within the scope of the present disclosure, including but not limited to distribution of the components across one or more IHSs.

Referring first to FIG. 2, the embodiment of the power demand reduction system 200 includes a power system 202 that includes a plurality of a power supply units (PSUs) 202a. While the illustrated embodiment is directed to a power system with a pair of redundant PSUs, other components such as additional PSUs, power distribution units (PDUs), and/or other power system components may be added to the power system 202 without departing from the scope of the present disclosure. The power system 202 is coupled to at least one powered component. In the illustrated embodiment, the at least one powered component includes a plurality of processors 204 that are coupled to the power system 202 through one or more voltage regulators 206. However, the power system 202 may be coupled to a variety of IHS component such as, for example, memory devices, storage devices, input/output (I/O) connectors, expansion cards, graphics processors, video adapters, and/or a variety of other IHS components known in the art. The power system 202 is also coupled to a power demand reduction circuit 208. In the illustrated embodiment, each of the PSUs 202a in the power system 202 outputs a signal to an NAND gate 208a in the power demand reduction circuit 208, and that NAND gate 208a outputs a signal to a latch 208b in the power demand reduction circuit 208. In an embodiment, the signal output by the PSUs 202a in the power system 202 to the NAND gate 208a may include a "power good" signal or other signal that indicates that power is being output by that PSU. The latch 208b in the power demand reduction circuit 208 includes a load reduce output 208c and a reset input 208d. The reset input 208d from the latch 208b is coupled to a service processor 210 to allow the service processor 210 to reset the latch 302b, discussed in further detail below. The load reduce output 208c from the latch 208b is coupled to a field-effect transistor (FET) 212 and the service processor 210. An air moving system 214 is coupled to the power system 202 and the FET 212. In the illustrated embodiment, the air moving system 214 includes a plurality of fans 214a that receive an input current from the PSUs 202a in the power system 202, and that have a return current (e.g., the ground return) coupled to the FET 212. However, a variety of air moving systems may replace or supplement the air moving system 214 of the illustrated embodiment, including blowers or other air moving devices known in the art.

Referring next to FIG. 3, a power demand reduction system 300 includes many similar components to the power demand reduction system 200, but with a few modifications. The power demand reduction system 300 includes the power system 202 having the plurality of a power supply units (PSUs) 202a, and may include additional PSUs, power distribution units (PDUs), and/or other power system components, as discussed above. The power system 202 is also coupled to at least one powered component which, in the illustrated embodiment, includes the plurality of processors 204 that are coupled to the power system 202 through one or more voltage regulators 206. As discussed above, the power system 202 may be coupled to a variety of IHS component such as, for example, memory devices, storage devices, input/output (I/O) connectors, expansion cards, graphics processors, video adapters, and/or a variety of other IHS components known in the art. The power system 202 is coupled to a power demand reduction circuit 302. In the illustrated embodiment, each of the PSUs 202a in the power system 202 outputs a signal to an OR gate 302a in the power demand reduction circuit 302, and that OR gate 302a outputs a signal to each of the processors 204 and to a latch 302b in the power demand reduction circuit 302. In an embodiment, the signal output by the PSUs 202a in the power system 202 to the OR gate 302a may include an over-current warning signal or other signal that indicates that the power being output by the PSU is exceeding or may be within a range of the maximum PSU output capacity. In an embodiment, the output of the OR gate 302a that is provided to the processors 204 may be provided to a throttling input such as, for example, the PROC_HOT input on the processors 204. In other embodiments, the output of the OR gate 302a may be provided to other component throttling inputs such as, for example, the MEM_HOT input of memory devices. The latch 302b in the power demand reduction circuit 208 includes a load reduce output 302c and a reset input 302d. The reset input 302d from the latch 302b is coupled to a timer 304 that is operable to reset the latch 302b, discussed in further detail below. The load reduce output 302c from the latch 302b is coupled to a field-effect transistor (FET) 212 and the timer 304. An air moving system 214 is coupled to the power system 202 and the FET 212. In the illustrated embodiment, the air moving system 214 includes a plurality of fans 214a that receive an input current from the PSUs 202a in the power system 202, and that have a return current (e.g., the ground return) coupled to the FET 212. However, a variety of air moving systems may replace or supplement the air moving system 214 of the illustrated embodiment, including blowers or other air moving devices known in the art.

Figure 4:
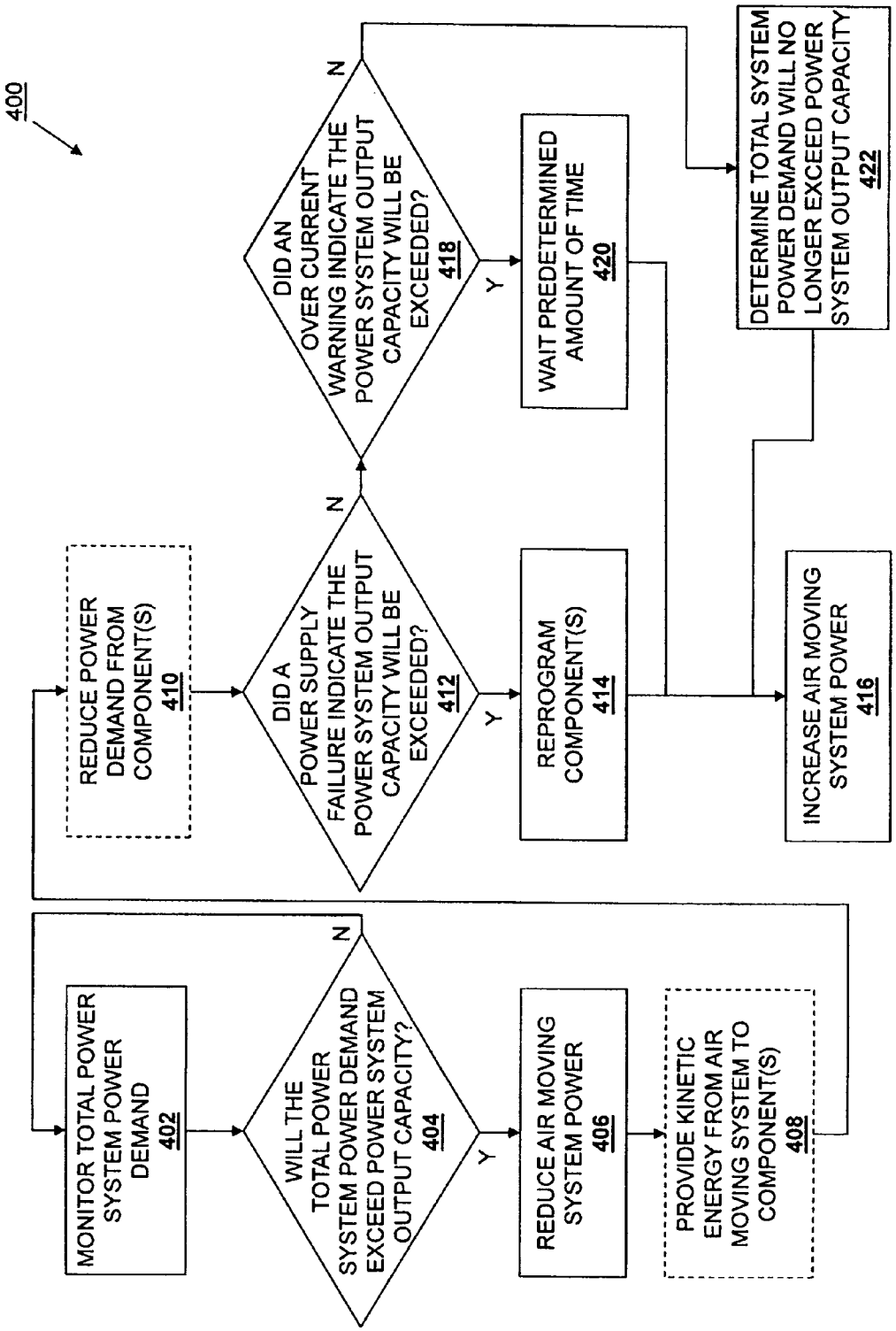
FIG. 4 is a flow chart illustrating an embodiment of a method for power system power demand reduction.

Referring now to FIG. 4, an embodiment of a method 400 for power system power demand reduction is illustrated. The method 400 is provided to describe the operation of either of the power demand reduction systems 200 or 300, and thus in some embodiments may have blocks omitted. For example, the power demand reduction system 200 may be provided for embodiments with a plurality of PSUs (e.g., including redundant PSUs in which one of those plurality of PSUs fail, and the system is operable to reprogram or reconfigure components within the system to use less power, as discussed in further detail below. In another example, the power demand reduction system 300 may be provided for embodiments with PSU's that produce over-current warnings. While the power demand reduction systems 200 and 300 are illustrated and described as separate systems, one of skill in the art will recognize that they may be combined while remaining within the scope of the present disclosure. Furthermore, as discussed below, some blocks of the method 400 may be optional and thus may be omitted in some embodiments.

The method 400 begins at block 402 where the total power system power demand is monitored. In an embodiment, the power system 200 provides power to a plurality of IHS components in an IHS such as, for example, the processors 204, and at block 402, the PSUs 202a, or associated subsystems may monitor the total power system power demand from the IHS. The total power system power demand may be monitored using a system current monitor coupled between a power provisioning device in the power system 200 and the IHS, load detectors at various locations within the IHS (e.g., at point of load (POL) voltage regulators that convert power from the power system to a power appropriate for their associated IHS component), and/or using a variety of other power demand monitoring devices known in the art.

The method 400 then proceeds to decision block 404 where the system determines whether the total power system power demand will exceed a power system output capacity. In an embodiment, the power system 202 is operable to determine whether a power demand (e.g., a current draw) from the IHS will exceed a power system output capacity of the power system 202. In an embodiment, each of the PSUs 202a in the power system 202 may include a power output capability that defines the maximum power output of the PSU before a shutdown of the PSU occurs, a power output range in within which a warning will be sent if the power output comes within that range of the maximum power output capability, and/or that includes a variety of other power output capability information known in the art.

In one example, as discussed above with reference to the power demand reduction system 200, the PSUs 202a may each provide a signal to the NAND gate 208a in the power demand reduction circuit 208 when the power output of that PSU is good (e.g., a "power good" signal) to indicate that power is being output by the PSU. As long as the NAND gate 208a is receiving the power good signal from each of the PSUs 202a, that will indicate to the power demand reduction system 200 that the total power system power demand will not exceed the power system output capability (i.e., the PSUs 202a may be provided such that either or both of their power output capacities are sufficient to provide a power system output capability to power an IHS, and thus if each PSU 202a is outputting a power good signal, then the total power system power demand cannot exceed the power system output capacity.) Thus, if at decision block 404 each of the PSUs 202a are providing the power good signal to the NAND gate 208a, that indicates that the total power system power demand will not exceed the power system output capacity, and the method 400 returns to block 402 where the total power system power demand by the IHS is monitored to determine whether the total power system power demand will exceed the power system output capability.

Still referring to the power demand reduction system 200, if the NAND gate 208a stops receiving the "power good" signal from at least one of the PSUs 202a, that will indicate to the power demand reduction system 200 that the PSU 202a that has stopped sending the power good signal has failed, and that the total power system power demand is exceeding or will exceed the power system output capability (i.e., the PSUs 202a may be provided such that either or both of their power output capacities are sufficient to provide a power system output capability to power an IHS, and thus if a PSU 202a fails, then the total power system power demand is exceeding or will exceed the power system output capacity.) Thus, if at decision block 404 either of the PSUs 202a stops providing the power good signal to the NAND gate 208a, that indicates that the total power system power demand will exceed the power system output capacity, and the method 400 proceeds to block 406, discussed in further detail below.

In another example, as discussed above with reference to the power demand reduction system 300, either of the PSUs 202a may provide an over-current signal to the OR gate 302a in the power demand reduction circuit 302 when the power demand on that PSU is exceeding or about to exceed (e.g., within a range of) a power supply output capability of that PSU. As long as the OR gate 302a does not receive the over-current signal from either of the PSUs 202a, that will indicate to the power demand reduction system 300 that the total power system power demand will not exceed the power system output capability (i.e., the PSUs 202a may be provided such that either or both of their power output capacities are sufficient to provide a power system output capability sufficient for the average power requirements of an IHS, and thus if neither PSU 202a is outputting an over-current signal, then the total power system power demand is not in danger of exceeding the power system output capacity.) Thus, if at decision block 404 neither of the PSUs 202a are providing the over-current signal to the OR gate 302a, that indicates that the total power system power demand will not exceed the power system output capacity, and the method 400 returns to block 402 where the total power system power demand by the IHS is monitored to determine whether the total power system power demand will exceed the power system output capability.

Still referring to the power demand reduction system 300, if the OR gate 302a receives the over-current signal from at least one of the PSUs 202a, that will indicate to the power demand reduction system 200 that the IHS (e.g., one or more of the processors 204) is performing a transient power excursion that may cause the total power system power demand to exceed the power system output capability (i.e., the PSUs 202a may be provided such that either or both of their power output capacities are sufficient to provide a power system output capability sufficient for the average power requirements of an IHS, but transient power excursions by the IHS (e.g., dynamic and/or peak power excursions by the processors 204) may cause the total power system power demand to exceed the power system output capacity.) Thus, if at decision block 404 either of the PSUs 202a provides the over-current signal to the OR gate 302a, that indicates that the total power system power demand will exceed the power system output capacity, and the method 400 proceeds to block 406.

The method 400 then proceeds to block 406 where air moving system power is reduced. In an embodiment, in response to the total power system power demand exceeding the power system output capacity, the power demand reduction circuit 208/302 is operable to reduce the power provided to the air moving system 214. As discussed below, in some embodiments the air moving system power may be completely eliminated at block 406, while in other embodiments the air moving system power may be partially reduced. Furthermore, the extent of air moving system power reduction may be relatively short or relatively long. For example, the power demand reduction system 300 illustrated in FIG. 3 may require air moving system power reduction for a relatively short time (e.g., a millisecond or less to deal with power excursions by the IHS, processors in the IHS, etc.), while the power demand reduction system 200 may require air moving system power reduction for a relatively long time (e.g., several second to deal with IHS component reprogramming to reduce total power system power demand.) However, because the thermal capacitance of IHSs is generally in the range of 5 to 20 seconds, these reductions in air moving system power will not introduce any overheating problems into the IHS operation.

In one example, as discussed above with reference to the power demand reduction system 200, if either of the PSUs 202a stops providing the power good signal to the NAND gate 208a, the NAND gate 208a outputs a signal to the latch 208b that causes the latch 208b to output a signal from the load reduce output 208c to the FET 212. In an embodiment, in response to receiving the signal from the load reduce output 208c of the latch 208b, the FET 212 interrupts the return current of the fans 214a in the air moving system 214, thus eliminating power to the air moving system 214. In other embodiments, the FET 212 may be operated to reduce the power to the air moving system 214 rather than eliminating it. In an embodiment, power may be reduced to the fans by lowering the pulse width modulation signal sent to the fan, effectively reducing the fan speed and corresponding power consumption by the fan. In other examples, a complex programmable logic device (CPLD), chassis management controller (CMC), and/or other components in the IHS may be used to reduce the pulse width modulation.

In another example, as discussed above with reference to the power demand reduction system 300, if either of the PSUs 202a provides the over-current signal to the OR gate 302a, the OR gate 302a outputs a signal to the latch 302b that causes the latch 302b to output a signal from the load reduce output 302c to the FET 212. In an embodiment, in response to receiving the signal from the load reduce output 302c of the latch 302b, the FET 212 interrupts the return current of the fans 214a in the air moving system 214, thus eliminating power to the air moving system 214. In other embodiments, the FET 212 may be operated to reduce the power to the air moving system 214 rather than eliminate it. In an embodiment, power may be reduced to the fans by lowering the pulse width modulation signal sent to the fan, effectively reducing the fan speed and corresponding power consumption by the fan. In other examples, the CPLS, CMC, and/or other components in the IHS may be used to reduce the pulse width modulation.

The method 400 may then proceed to optional block 408 where kinetic energy from the air moving system is provided to one or more IHS components in the IHS. In an embodiment, the air moving system 214 includes one or more air moving device that move to create kinetic energy (e.g., the fans 214a in the illustrated embodiment.) In one example, at block 406 of the method 400 the power to the air moving system 213 is eliminated and the fans 214a continue rotating due to the momentum generated when they were powered. The kinetic energy from the rotating but unpowered fans is then provided to IHS components such as, for example, the processors 204. One of skill in the art will recognize that the power systems 200 and 300 may include several components (not illustrated) that allow the kinetic energy of the air moving system 214 to be harvested and provided to the IHS components upon the reduction of air moving system power to the air moving system.

The method 400 may then proceed to optional block 410 where power demand from IHS components is reduced. In an embodiment, in response to the total power system power demand exceeding the power system output capacity, the power system 202 is operable to reduce the power demanded by one or more IHS components in the IHS.

In one example, as discussed above with reference to the power demand reduction system 300, if either of the PSUs 202a provides the over-current signal to the OR gate 302a, the OR gate 302a outputs a signal to the processors 204 may be provided to a throttling input such as, for example, the PROC_HOT input on the processors 204. In one embodiment, the signal provided to the PROC_HOT input on the processors 204 throttles the processors 204 to reduce the power demand of the processors 204 on the power system 202 by, for example, reducing frequency, bandwidth, voltage, and/or other processor power characteristics known in the art. In other embodiment, throttling may be performed similarly as described for the processors 204 on any IHS components in the IHS (e.g., using a MEM_HOT input on a memory devices in the IHS.)

The method 400 then proceeds to decision block 412 where it is determined whether a power supply failure indicates the power system output capacity will be exceeded. In an embodiment, the determination in decision block 412 may not actually be performed by any component in the power demand reduction systems 200 or 300, but rather is provided to distinguish the operation of the power demand reduction systems 200 and 300 from each other. If at decision block 412, a power supply failure was responsible for the indication that the power system output capacity would be exceeded, the method 400 proceeds to block 414 where IHS components are reprogrammed. For example, as discussed above with reference to the power demand reduction system 200, if either of the PSUs 202a stops providing the "power good" signal to the NAND gate 208a, the NAND gate 208a outputs a signal to the latch 208b that causes the latch 208b to output a signal from the load reduce output 208c to the service processor 210. In an embodiment, in response to receiving the signal from the load reduce output 208c of the latch 208b, the service processor 210 (e.g., a power management processor) may reprogram one or more IHS components for lower power consumption. For example, the service processor 210 may change the performance state of one or more of the processors 204 such that the processors 204 consume less power. The method 400 then proceeds to block 416 where the air moving system power is increased. In an embodiment, following the reprogramming of the IHS components in block 414, the service processor 210 provides a signal to the reset input 208d of the latch 208b in order to reset the latch 208d, which causes the latch 208b to stop the signal from the load reduce output 208c such that the FET 212 no longer interrupts the return current of the fans 214a in the air moving system 214. With the return current no longer interrupted, the fans 214a in the air moving system receive air moving system power and resume rotating to move air through the IHS and past the IHS components. In an embodiment, the air moving system 214 may have only had its power reduced (rather than eliminated) in block 406, and thus the air moving system 214 may have full air moving system power resumed at block 416 or may have its air moving system power increased from some reduced level that is below the air moving system power provided prior to block 406. During the time between the PSU 202a failure and the reprogramming of the IHS components, the power system 202 is vulnerable to excessive current draw from the IHS causing shut down of the remaining PSUs, and the system of the present disclosure may prevent such shut down by reducing the air moving system power upon PSU failure and until reprogramming occurs.

If at decision block 412 a power supply failure was not responsible for the indication that the power system output capacity would be exceeded, the method 400 proceeds to decision block 418 where it is determined whether an over-current warning indicated that the power system output capacity would be exceeded. Similarly to decision block 412 discussed above, the determination in decision block 418 may not actually be performed by any component in the power demand reduction systems 200 or 300, but rather is provided to distinguish the operation of the power demand reduction system 200 and 300 from each other. If at decision block 418, an over-current warning was responsible for the indication that the power system output capacity would be exceeded, the method 400 proceeds to block 420 where the power demand reduction system 300 waits a predetermined amount of time. For example, as discussed above with reference to the power demand reduction system 300, if either of the PSUs 202a provides an over-current signal to the OR gate 302a, the OR gate 302a outputs a signal to the latch 302b that causes the latch 302b to output a signal from the load reduce output 302c to the timer 304. In an embodiment, in response to receiving the signal from the load reduce output 302c of the latch 302b, the timer 304 is started and operates for a predetermined amount of time. In an embodiment, the predetermined amount of time may be selected using a known time needed for load reduction mechanisms in the processors 204 to reduce the power demand of the processors 204. For example, the load reduction mechanism in the processors 204 may have a response time that is greater than the time that a PSU 202a can endure an over-current situation without shutting down, and the predetermined amount of time that the timer 304 operates may be selected such that air moving system power is reduced until the load reduction mechanisms in the processors 204 can respond to an over-current situation and reduce power demand from the processors 204.

The method 400 then proceeds to block 416 where the air moving system power is increased. In an embodiment, after the timer 304 operates for the predetermined amount of time, the timer 304 sends a signal to the reset input 302d of the latch 302b in order to reset the latch 302b, which causes the latch 302b to stop the signal from the load reduce output 302c such that the FET 212 no longer interrupts the return current of the fans 214a in the air moving system 214. With the return current no longer interrupted, the fans 214a in the air moving system receive air moving system power and resume rotating to move air through the IHS and past the IHS components. In an embodiment, the air moving system 214 may have only had its power reduced (rather than eliminated) in block 406, and thus the air moving system 214 may have full air moving system power resumed at block 416 or may have its air moving system power increased from some reduced level that is below the air moving system power provided prior to block 406.

If at decision block 412 an over-current warning was not responsible for the indication that the power system output capacity would be exceeded, the method 400 proceeds to block 422 where it is determined that the total system power will no longer exceed the power system output capacity. In an embodiment, a power demand reduction system operating according to the teachings of the present disclosure may determine that the total system power demand from the IHS will no longer exceed the power system output capacity. For example, the power demand reduction system may be operable to monitor the power demand of the IHS (e.g., through one or more monitoring points such as, for example, the voltage regulators for high power demand components in the IHS) and determine that the power demand has reduced to a level that is within the power system output capacity of the power system 202. In response, the method 400 proceeds to block 416 where air moving system power is increased. Similarly as described above, once the total system power demand is within the capacity of the power system 202, air moving system power to the air moving system 204 may be resumed or increased such that the air moving system 214 provides system cooling to the IHS.

Figure 5A:
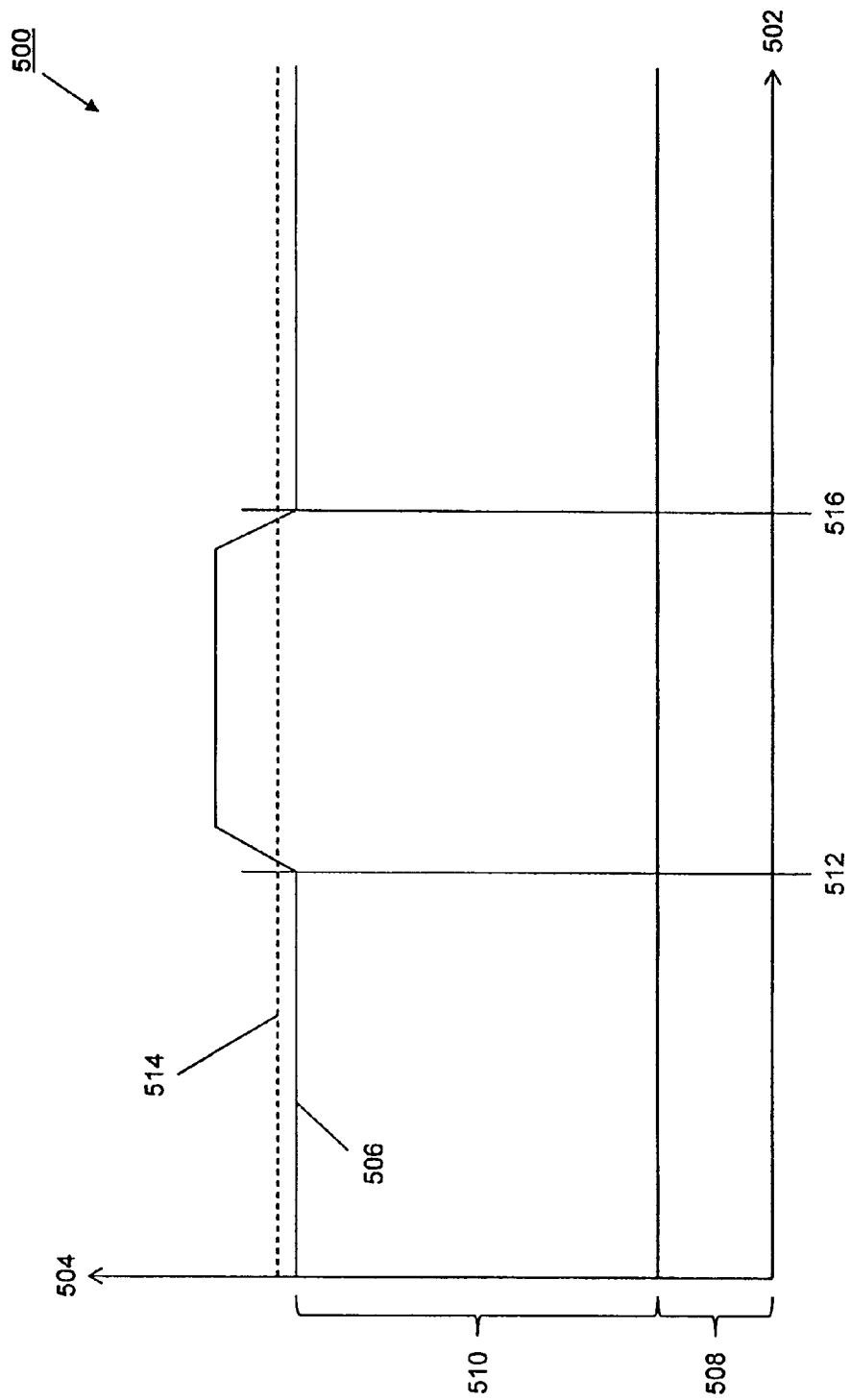
FIG. 5a is a graph illustrating a total power system power demand, including a an air moving system power demand and an other IHS components power demand, without the use of a power demand reduction system.

Referring now to FIG. 5a, a graph 500 is provided to illustrate conventional IHS power demand for a conventional IHS. The graph 500 includes time 502 on the X-axis and power demand 504 on the Y-axis. The graph 500 also includes a total system power demand 506 that is made up of an air moving system power demand 508 and an other IHS components power demand 510 that does not include the power demand of the air moving system but may include the power demand from any other of the IHS components in the IHS (e.g., from the processors, memory, etc.). As can be seen in the graph 500, prior to time 512, the total system power demand 506 is below a power system output capacity 514. Then, at time 512, a power excursion may occur due to a processor performing a dynamic or peak power excursion, a power demand increase may occur due to a failed power supply, and/or the total power system power demand may increase due to a variety of other power scenarios known in the art). The increase in the total power system power demand 506 exceeds the power system output capacity 514 until time 516, at which point the power excursion ends and the total system power demand 506 returns below the power system output capacity 514. As explained below, the total system power demand 506 exceeding the power system output capacity 514 between times 512 and 516 can cause shutdown of the power system and the associated loss of data.

Figure 5B:
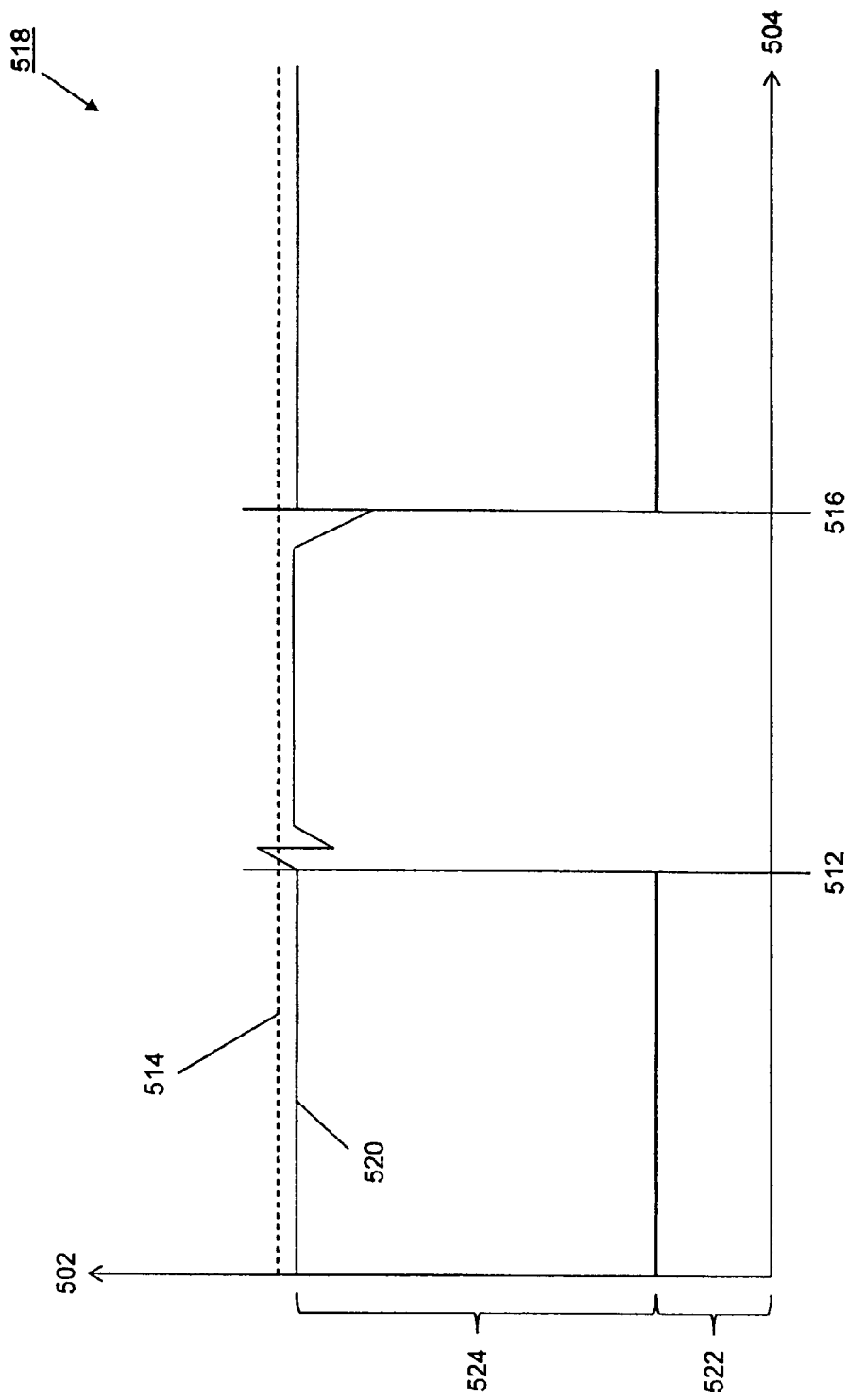
FIG. 5b is a graph illustrating a total power system power demand, including an air moving system power demand and an other IHS components power demand, with the use of a power demand reduction system.

Referring now to FIG. 5b, a graph 518 is provided to illustrate IHS power demand for the power demand reduction system of the present disclosure. The graph 518 also includes time 502 on the X-axis and power demand 504 on the Y-axis, along with a total system power demand 520 that is made up of an air moving system power demand 522 and an other IHS components power demand 524 that does not include the power demand of the air moving system but may include the power demand from any other of the IHS components in the IHS (e.g., from the processors, memory, etc.). As can be seen in the graph 518, prior to time 512, the total system power demand 506 is below a power system output capacity 514. Then, at time 512, the total power system power demand may increase (e.g., due to a processor performing a dynamic or peak power excursion, due to a failed power supply, and/or due to a variety of other power scenarios known in the art) that causes the total system power demand 506 to exceed or begin to exceed the power system output capacity 514. However, as discussed above, in response to total system power demand 506 indicating it will exceed the power system output capacity 514, the power demand reduction system of the present disclosure can reduce the air moving system power to the air moving system in order to reduce the total system power demand on the power system. For example, as illustrated in the graph 518, the air moving system power demand 522 may be eliminated, thus reducing the total system power demand 520 such that it remains below the power system output capacity 514 between times 512 and 516 (e.g., during a power excursion of the processors 204, a failure of a PSU 202a, etc).

Following time 516, when the power excursion has ended, the air moving system power may be resumed, resulting in the air moving system power demand 522 returning to the level prior to time 512, while the total system power demand 524 remains below the power system output capacity 514. One of skill in the art will recognize that a reduction in air moving system power may be tailored to known power excursions or power demands resulting from PSU failures such that the air moving system power need not be completely eliminated, but rather reduced to a level such that the total power system power demand is lower than the power system output capability.

Thus, a system and method have been described that responds to a total system power demand that will exceed a power system output capacity by reducing the air moving system power provided to the air moving system in order to provide sufficient power to IHS components during power supply failures, power excursions, and/or other power scenarios, and sustains that reduction until the total system power demand changes such that increase in the air moving system power will not adversely affect the power system. While two specific examples have been provided above that include mechanisms for detecting and indicating the need for a power demand reduction, other mechanisms may be substituted or provided as well, including but not limited to failure warnings from the power system other than an over-current warning, power demand detectors within the IHS for indicating a relatively high power demand, power demand detectors in individual devices, power demand detectors that emulate individual-device power demand detectors, and/or a variety of other mechanisms known in the art for detecting and indicating the need for a power demand reduction. Thus, any mechanism for indicating a need for a power demand reduction may fall within the scope of the present disclosure. Furthermore, the examples above describe one method for gating or reducing air moving system power to the air moving system. However, other methods for reducing the air moving system power to the air moving system such as, for example, interrupting current flow through the high-voltage input to the fans, the provision of a signal to the fan motor controller that results in gating or suppression of voltage applied to the fan's motor windings (e.g., a dedicated input, a input multiplexed with one or more other function inputs such as, for example, the use of a pulse width modulation signal in which one width setting indicates power should be gated, etc.), and/or a variety of other air moving system power reduction methods with fall within the scope of the present disclosure. Thus, any methods for gating or reduction power to an air moving system may fall within the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power demand reduction system, comprising:
   at least one powered component;
   an air moving system that is configured to cool the at least one powered component;
   a power demand reduction circuit that is coupled to the air moving system and that is configured to couple to a power system including a power supply unit (PSU), wherein the power demand reduction circuit is configured to:
   receive a PSU over-current warning signal directly from the PSU, wherein the PSU over-current warning signal indicates that a PSU power demand on the PSU will exceed a power supply output capability of the PSU;
   determine that a total power system power demand will exceed a power system output capacity of the power system in response to a powered component power demand from the at least one powered component and the PSU over-current warning signal;
   activate a load reduction mechanism in the at least one powered component to reduce a power demand from the at least one powered component;
   reduce an air moving system power provided to the air moving system and provide a rotational kinetic energy from the air moving system to the at least one powered component subsequent to reducing the air moving system power such that the powered component power demand from the at least one powered component will no longer cause the total power system power demand to exceed the power system output capacity of the power system; and
   determine that a predetermined time period has passed that is required for the load reduction mechanism in the at least one powered component to reduce the power demand from the at least one powered component and, in response, restore the air moving system power provided to the air moving system.

2. The power demand reduction system of claim 1, wherein the
   at least one powered component includes at least one processor.

3. The power demand reduction system of claim 1, wherein the predetermined time period that is required for the load reduction mechanism in the at least one powered component to reduce the power demand from the at least one powered component is greater than a PSU-related time period that the PSU can endure the PSU power demand that exceeds the power supply output capability of the PSU without shutting down.

4. The power demand reduction system of claim 1, wherein the reducing the air moving system power provided to the air moving system including completely removing the air moving system power provided to the air moving system.

5. The power demand reduction system of claim 1, wherein the reducing the air moving system power provided to the air moving system including reducing first air moving system power provided to the air moving system to a second air moving system power that allows the air moving system to operate.

6. An information handling system (IHS), comprising:
   a processor;
   a memory coupled to the processor;
   an air moving system that is configured to cool the processor and the memory;
   a power system coupled to the processor, the memory, and the air moving system, wherein the power system includes a power supply unit (PSU); and
   a power demand reduction circuit coupled to the air moving system and the power system, wherein the power demand circuit is configured to:
   receive a PSU over-current warning signal directly from the PSU, wherein the PSU over-current warning signal indicates that a PSU power demand on the PSU will exceed a power supply output capability of the PSU;

determine that a total power system power demand that will exceed a power system output capacity of the power system in response to a processor power demand from the processor and the PSU over-current warning signal;

activate a load reduction mechanism in the processor to reduce a power demand from the processor;

reduce an air moving system power provided to the air moving system and provide a rotational kinetic energy from the air moving system to the processor subsequent to reducing the air moving system power such that the processor power demand from the processor will no longer cause the total power system power demand to exceed the power system output capacity of the power system; and determine that a predetermined time period has passed that is required for the load reduction mechanism in the processor to reduce the power demand from the processor and, in response, restore the air moving system power provided to the air moving system.

7. The IHS of claim 6, wherein the predetermined time period that is required for the load reduction mechanism in the processor to reduce the power demand from the processor is greater than a PSU-related time period that the PSU can endure the PSU power demand that exceeds the power supply output capability of the PSU without shutting down.

8. The IHS of claim 6, wherein the reducing the air moving system power provided to the air moving system including completely removing the air moving system power provided to the air moving system.

9. The IHS of claim 8, wherein the reducing the air moving system power provided to the air moving system including reducing first air moving system power provided to the air moving system to a second air moving system power that allows the air moving system to operate.

10. A method for power system power demand reduction, comprising:

monitoring a total power system power demand for a power system having a power system output capacity, wherein the power system includes a power supply unit (PSU);

receiving a PSU over-current warning signal directly from the PSU, wherein the PSU over-current warning signal indicates that a PSU power demand on the PSU will exceed a power supply output capability of the PSU;

determining that the total power system power demand will exceed the power system output capacity of the power system in response to a processor power demand from a processor and the PSU over-current warning signal;

activating a load reduction mechanism in the processor to reduce a power demand from the processor;

reducing an air moving system power provided to an air moving system and providing a rotational kinetic energy from the air moving system to the processor subsequent to reducing the air moving system power such that the processor power demand from the processor will no longer cause the total power system power demand to exceed the power system output capacity of the power system; and determining that a predetermined time period has passed that is required for the load reduction mechanism in the processor to reduce the power demand from the processor and, in response, restoring the air moving system power provided to the air moving system.

11. The method of claim 10, wherein the predetermined time period that is required for the load reduction mechanism in the processor to reduce the power demand from the processor is greater than a PSU-related time period that the PSU can endure the PSU power demand that exceeds the power supply output capability of the PSU without shutting down.

12. The method of claim 10, wherein the reducing the air moving system power provided to the air moving system including completely removing the air moving system power provided to the air moving system.

13. The method of claim 10, wherein the reducing the air moving system power provided to the air moving system including reducing first air moving system power provided to the air moving system to a second air moving system power that allows the air moving system to operate.

* * * * *